United States Patent [19]

Treber et al.

[11] Patent Number: 4,563,374
[45] Date of Patent: Jan. 7, 1986

[54] BLOW MOLDED DECORATIVE OR PROTECTIVE STRIP WITH TEMPERATURE COMPENSATION

[75] Inventors: Willi Treber, Wuppertal; Rolf Schlenz, Velbert; Gunter Fritsch, Ennepetal; Joseph Hansmann, Geretsried, all of Fed. Rep. of Germany

[73] Assignee: Gebr, Happich GmbH, Fed. Rep. of Germany

[21] Appl. No.: 613,515

[22] Filed: May 23, 1984

Related U.S. Application Data

[63] Continuation-in-part of Ser. No. 312,822, Oct. 19, 1981, abandoned.

[51] Int. Cl.$^4$ .......................... B29D 23/03; B32B 3/30
[52] U.S. Cl. ........................................ 428/31; 52/716; 293/128; 428/166; 428/167; 428/188
[58] Field of Search .................. 428/31, 166, 167, 212, 428/188; 293/128; 52/716

[56] References Cited

U.S. PATENT DOCUMENTS

| | | | |
|---|---|---|---|
| 3,419,458 | 12/1968 | Brooks et al. | 428/163 |
| 3,525,417 | 8/1970 | Giraudeau | 428/166 X |
| 3,606,433 | 9/1971 | Kunevicius | 428/31 X |
| 3,935,358 | 1/1976 | Wyeth et al. | 428/167 X |
| 4,072,334 | 2/1978 | Seegmiller et al. | 428/31 X |
| 4,246,303 | 1/1981 | Townsend | 428/31 |
| 4,351,868 | 9/1982 | Otani | 428/31 X |
| 4,360,549 | 11/1982 | Ozawa et al. | 428/31 |

FOREIGN PATENT DOCUMENTS

1527663 10/1978 United Kingdom .................. 428/31

Primary Examiner—Henry F. Epstein
Attorney, Agent, or Firm—Ostrolenk, Faber, Gerb & Soffen

[57] ABSTRACT

The invention concerns an elongate decorative and/or protective covering strip particularly for the exterior of an automotive vehicle. The strip is a single piece blow molded strip with a bottom that is applied to a surface and a top that is exposed. To provide length compensation due to temperature variations as between the top and the bottom of the strip and to absorb expansion differences as between the strip and the vehicle body, the bottom of the strip has a plurality of transversely extending groove shaped depressions defined in it along its length. At least some depressions in the bottom of the strip are of a height to extend nearly to the top of the strip and to thereby support the top of the strip against deformation. The depressions may have various heights toward the top of the strip. Transversely extending depressions may alternate with round depressions along the length of the strip. There may additionally be a longitudinally extending groove shaped depression defined in the bottom of the strip and/or in the top of the strip, and the crest of the longitudinally extending groove shaped depression may provide the deformation support noted.

10 Claims, 12 Drawing Figures

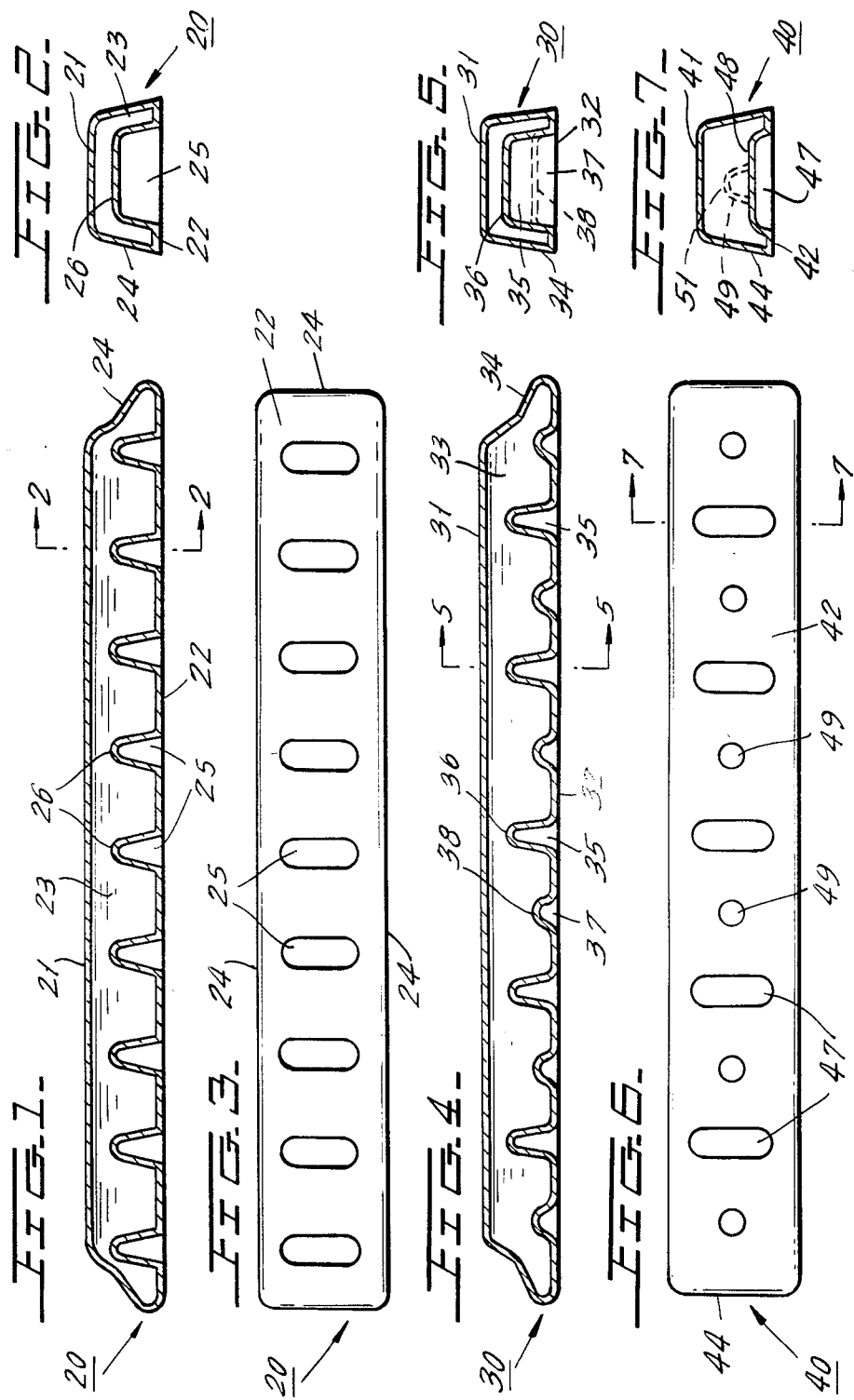

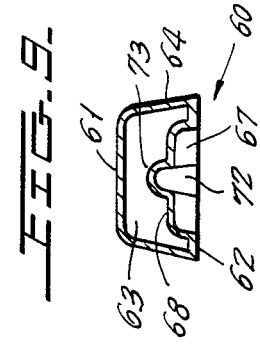

BLOW MOLDED DECORATIVE OR PROTECTIVE STRIP WITH TEMPERATURE COMPENSATION

CROSS REFERENCE TO RELATED APPLICATION

This is a continuation in part of application Ser. No. 312,822 filed Oct. 19, 1981 and now abandoned.

BACKGROUND OF THE INVENTION

The present invention concerns a decorative or protective strip for application to the body of an automative vehicle, or the like, and particularly to such a strip which is an enclosed, hollow blow molded unit with temperature compensation means built into it.

A blow molded strip has a bottom surface that is applied to the external surface of a vehicle or the like and a top surface which is spaced from the bottom surface and attached to it at their peripheral margins.

Blow molded protective or decorative strips are known from German Pat. No. 2,536,766 and its British counterpart No. 1,527,663, both by the inventer hereof. Blow molded strips have numerous advantages over strips manufactured by other methods. However, blow molded strips still have a major drawback when applied especially to the external surface of an automotive vehicle.

Automotive vehicles are exposed to a wide range of temperature variations. For example, the surface of the vehicle and of any strip applied to it is likely to become quite hot in the sunlight on a hot day. The strip, which is plastic, and the vehicle body, which is metal, have different coefficients of temperature expansion, and the temperature variations generate stresses which are likely to eventually cause the bottom surface of the strip to tear away from the vehicle body.

Variations which sometimes are found in the thickness of the walls of the decorative piece and the considerable temperature differences that are likely to arise as between the bottom surface of the strip, which is on the surface of the vehicle, and the top of the strip, which is spaced from the vehicle and faces outwardly, will cause the top or visible side of the decorative strip to expand or contract at different rates than the bottom or mounted side. Eventually, the side at the higher temperature may buckle and the mounted side of the strip may tear away from the side of the vehicle. The just described buckling will be more severe on decorative strips with a more convex cross section than on such strips with a flatter cross section.

Various alternative techniques have been tried for holding such decorative strips in place on the side of the vehicle. Attaching these strips using a number of closely aligned fasteners to mount the strips on the body of the vehicle, with the mounting deigned to absorb the mentioned expansion and contraction of the strip, have been tried. This effort, however, has only been partially successful, and then only when the strips were relatively thin. Cementing the bottom surface of the strip to the side of the vehicle has not been very successful, as the strips did not stay in place very long for the reasons discussed. Another aspect of the problem was the additional expense involved in materials required and in the assembly steps.

Above noted British Pat. No. 1,527,663 shows a strip with longitudinal grooves into the surface of the top of the strip. Being the inventor of that patent, the co-inventor hereof is also aware that these grooves are not corrugating depressions in the bottom of the strip. Those prior art strips have deformed due to temperature differentials between the top and the bottom of the strip and because of the different coefficients of expansion of the strip and the vehicle body. Such deformations have been great enough that the fastenings of the strip have yielded, e.g., the cement holding the strip in place has cracked, and the strip has popped off the surface.

SUMMARY OF THE INVENTION

It is the object of the invention to provide a blow molded decorative or protective strip, particularly for an automotive vehicle, that will be easy to manufacture, that will resist the buckling and separation from the vehicle that can be caused by temperature variations to which the strip and the vehicle to which it is attached are subjected and that will, therefore, remain attached to the surface of the vehicle for a long period of time, no matter whether the strip is attached by fasteners or clips or is applied with an adhesive on its bottom surface.

It is even possible that the strip will expand or contract at different rates along its length due to partial exposure to sunlight or for other reasons, and it is an object of the invention to permit different rates of expansion and/or contraction at different locations along the length of the strip.

It was the recognition that differential temperatures and expansions and contractions could occur between the top of the strip and the bottom of the strip which is fastened to the exterior of the vehicle and also between the bottom of the strip and the body of the vehicle that enabled the inventor hereof to develop the solution according to the invention.

The protective or decorative strip according to the invention is longitudinally elongate and narrower in width. It may be applied on the external side or body of the vehicle, or may be applied elsewhere. But, the strip of the invention is particularly useful on the exterior of the vehicle, as it includes temperature compensation means. The strip is a closed, blow molded body of plastic material. The strip has a bottom surface for being applied to the object to be covered. The strip also has a top surface which is secured to the bottom surface around their peripheries. The top and bottom of the strip are spaced from each other to define a hollow beteen them. Typically, the top of the strip has a contour for decorative purposes. The bottom is relatively flatter in contour than the top for being applied to the surface of the vehicle.

The invention comprises the bottom of the strip including length compensation structures for compensating the length of the bottom of the strip for expansion and contraction which results from temperature variations between the top of the strip, which is exposed to air, and the bottom of the strip, which is attached to the vehicle and also for compensating the length of the strip for different coefficients of expansion between the bottom of the strip and the body of the vehicle. The stresses normally present are absorbed. The primary length compensation structures comprise a plurality of transversely extending groove shaped depressions defined in the bottom of the strip. Each depression has a length dimension which extends transversely across the bottom of the elongate strip and has a shorter width dimension extending along the length of the elongate strip. Each depression is tall enough at the bottom of the strip for corrugating the bottom of the strip for enabling the top and bottom of the strip to expand and contract at different rates upon temperature variations, without transmitting unduly high stresses between them. The depressions also permit the bottom of the strip to expand and contract with respect to the vehicle body surface to which the strip is attached. In effect, the bottom of the strip is like an accordion bellows.

There are various possible arrangements of the depressions in the bottom of the strip for accomplishing the foregoing results. All of them share in common the presence of the transversely extending groove shaped depressions. In one embodiment, the groove shaped depressions are of different heights into the strip toward the top of the strip. In some embodiments, at least some of the groove shaped depressions in the bottom of the strip extend deeply enough into the strip toward the top of the strip that the peaks or crests of these depressions will support the top of the strip if the top of the strip is deformed inwardly toward the bottom of the strip by a transient force applied to the top of the strip. As the strip is blow molded and flexible, this additional support provided by the peaks of the depressions in the bottom of the strip prevent permanent deformation of the strip, which would be undesirable.

The transversely directed groove shaped depressions in the bottom of the strip make the strip longitudinally elastic. When the bottom of the strip is attached to the external surface of a vehicle, by cementing with an adhesive, for instance, the expansion and contraction of the strip is not impeded in the area of the transverse grooves and no forces are developed that could burst the adhesive. The provision of longitudinally alluding groove shaped depressions in a strip would not resolve this problem and certainly the provision of longitudinal grooves on the external surface of a strip as in British Pat. No. 1,527,663 would not resolve this problem. In fact, longitudinal groove shaped depressions on the exterior of the strip would have the opposite effect of stiffening the strip, rather than permitting it to expand and contract.

It would be possible to provide transversely extending grooves on the top of the strip for expansion absorption. These groove shaped depressions in the top of the strip would be redundant there because the outside of the strip is unattached and is likely already elastic enough to expand lngitudinally as needed.

Additionally, there may be a longitudinally extending, groove shaped depression in the bottom of the strip extending at least part way along the length of the strip and intersecting at least some of the transversely extending groove shaped depressions. Finally, there may be a longitudinally extending groove shaped depression in the top of the strip for decorative purposes and also extending at least part way along the length of the strip.

Longitudinal grooves, especially if there are a plurality of them in one surface, such as the outer surface, as in British Pat. No. 1,527,663, have a tendency to rigidify a strip, rather than permitting it to expand and contract in the lengthwise direction. The transversely extending groove shaped depressions of the invention, in contrast, permit the top and bottom of the strip to expand and contract longitudinally at different rates.

The presence of a longitudinally extending groove shaped depression in the bottom of the strip is practical when the top of the strip bulges significantly, that is when the strip has a very concave cross section. A strip which is especially large or has a very concave cross section benefits from the use of a combination of transverse and longitudinal groove shaped depressions in the bottom of the strip. The longitudinal depression especially can serve the additional purpose of reinforcing the strip against flexing along its length. Also, where there is a longitudinal depression in addition to the transverse ones and if they have different depths in particular, they will help dissipate the energy of deflection.

A strip according to the invention has another benefit in that it is easier to mount to a vehicle automatically using rollers. This is especially important in automotive technology when strips in accordance with the invention are employed as lateral strips on motor vehicles and are adhered to the sides of the vehicle by an adhesive cement.

Other objects and features of the present invention will become apparent from the following description of various preferred embodiments of the invention, all incorporating transverse groove shaped depressions, considered in conjunction with the accompanying drawings.

BRIEF DESCRIPTION OF THE DRAWINGS

FIG. 1 is a side cross sectional view of a decorative or protective strip of a first embodiment according to the invention;

FIG. 2 is a transverse cross sectional view thereof along the line 2—2 in FIG. 1;

FIG. 3 is a bottom view of the first embodiment of the invention;

FIG. 4 is a side cross sectional view of a second strip embodiment of the invention;

FIG. 5 is a transverse cross sectional view thereof along the line 5—5 of FIG. 4;

FIG. 6 is a bottom view of a third strip embodiment of the invention;

FIG. 7 is a transverse cross sectional view of the third embodiment along the line 7—7 in FIG. 6;

FIG. 8 is a longitudinal cross sectional view of a fourth strip embodiment of the invention;

FIG. 9 is a transverse cross sectional view thereof along the line 9—9 in FIG. 8;

FIG. 10 is a bottom view of the fourth embodiment;

FIG. 11 is a longitudinal cross sectional view through a fifth strip embodiment of the invention; and FIG. 12 is a transverse cross sectional view thereof along the line 12—12 in FIG. 11.

DESCRIPTION OF THE PREFERRED EMBODIMENTS

The various embodiments of blow molded protective and decorative strips described below are conventionally blow molded completely enclosed, hollow plastic structures. While the particular materials of which the strip are comprised is not part of the present invention, examples of those materials are now briefly described. For example, the strip may be comprised of a polypropylene copolymer or may be comprised of a low density polyethylene.

In all of the below described embodiments, the body of the strip is attached to a vehicle surface, which is not shown, while the top of the strip is an exposed surface. In all of the embodiments, the specific manner of attachment of the strip to a surface is not relevant to the invention. However, it is a benefit of the invention that virtually any type of known fastening technique may be used, including a cement adhesive, bolts, clips, etc., which are typically employed for mounting ordinary protective strips to the side of a vehicle. The strip of the invention is specifically intended to facilitate satisfactory long duration mounting of the strips using an adhesive or a tape having an adhesive on both surfaces, for instance.

The integral, one piece strip 20 of the first embodiment includes a top 21 and a bottom 22. The bottom 22 is generally flat. The top also is generally flat and is spaced away from the bottom a distance to define a hollow interior 23 for the strip. It is at the peripheral or marginal regions 24 of the strip that the top of the strip inclines toward the bottom of the strip and meets the same to define the single enclosed structure. Usually, the top and the bottom of the strip will have the same length, although it is possible for the top and bottom to differ in length.

The length compensation structures to be described, however, would still be needed in the bottom of the strip. There are a plurality of spaced apart, transversely extending, groove shaped depressions 25 defined in the integral bottom 22 of the strip 20. In the first embodiment, each of these groove shaped depressions defined in the bottom 22 is longer in its dimension transversely across the strip than it is wide in its dimension along the length of the strip. This is typically the shape of those groove shaped depressions in the bottoms of all of the embodiments for enabling length compensation of the strips. The depressions 25 are of uniform shape, of uniform spacing and of uniform height into the strip. These factors may be varied in a practical embodiment within the contemplation of the invention for achieving the desirable length compensation characteristics. The depressions extend transversely across the strip, but not so far as to intersect the side margins 24 of the strip. The groove shape depressions are deep enough into the bottom of the strip to generally corrugate the bottom of the strip. As the top and bottom of the strip are caused to expand or contract at different rates and as the bottom of the strip has a different coefficient of expansion than the vehicle body surface (not shown) to which the bottom is applied, the expected deformation of the strip is absorbed by accordioning of the corrugated bottom of the strip and damaging stresses, which could destroy the strip or tear it from the vehicle surface, do not occur. The corrugations also strengthen the bottom of the strip against mechanical deformation by pressure applied to it from above, that is, from the top of the strip.

The depressions 25 have crests 26 which project far enough toward the inner surface of the top 21 of the strip that if the top of the strip 21 is mechanically depressed downwardly toward the bottom of the strip, as by someone pushing against the strip, the crests 26 will support the top of the strip and prevent the top of the strip from becoming permanently deformed. The corrugated shape of the bottom of the strip rigidifies the strip sufficiently that although the entire strip is flexible, elastic material, the top of the strip will be supported against undesired depression.

The second embodiment 30 of protective or decorative strip of FIGS. 4 and 5 share many features in common with the first embodiment of the strip. These common features are not further described and they are simply referred to by corresponding reference numerals raised by 10. In this embodiment the groove shaped depressions 35 in the bottom 32, which extend to their crests 36 far toward the top 31 of the strip, alternate along the length of the strip 30 with shallower groove shaped depressions 37 whose crests 38 are farther from the top 31 than the crests 36. Therefore the crests 38 do not provide a supporting function for the top 31 of the strip. The spacing along the length of the strip 30 of the depressions 35, 37 may be varied. The depressions need not alternate, but a few of one type of the depressions may follow the other, etc.

The third embodiment 40 of the protective or decorative strip of FIGS. 6 and 7 again has many features in common with the strips of the other embodiments and the reference numerals for this embodiment correspond to the reference numerals in the previous embodiment, raised by another 10. Corresponding elements previously described will not be redescribed. In this embodiment, the different features are the round, deep depressions 49, which alternate with the shallower transverse groove shapoed depressions 47 along the longitudinal length of the strip. The depressions 47 are of the shallower variety, like the shallow depressions 37 in FIGS. 4 and 5. Therefore, it is the crests 51 of the deep, round depressions 49 that support the top 41 of the strip when it is deformed while the crests 48 of the shallow depressions 47 do not provide such support. Again, the spacing of the shallow transversely extending depressions 47 and the round depressions 49 need not be uniform along the length of the strip and they need not alternate as shown in FIG. 6. There may instead be groupings of adjacent transverse depressions 47 and of round depressions 49.

The fourth embodiment 60 of protective or decorative strip shown in FIGS. 8-10 has elements in common with the previous embodiments. Its correspoonding elements to those of the previous embodiment are identified by the same reference numerals as in the previous embodiment, raised by 20 and will not be further described. This embodiment also includes shallow transversely extending depressions 67 whose crests 68 do not extend far enough to the top 61 of the strip to provide a supporting function when the strip is deformed. The strip 60 is provided with a narrow width, elongate, quite deep longitudinal groove shaped depression 72 in the bottom 62 of the strip. The depression 72 extends deep enough into the strip to provide support for the top 61 of the strip if it is deformed downwardly. The longitudinal groove shaped depression 72 is narrower in the direction transversely of the strip 60 than is the length dimension of the transverse depressions 67. The depression 72 intersects the depressions 67 and does not interfere with the expansion and contraction of the bottom of the strip which the transverse depressions 67 permit. The depressions 67 are shown uniformly spaced over the length of the strip 60 although this is not required. Further, the depression 72 is shown at the center of the strip and this is not required. Also, there might be a plurality of the depressions 72 so long as they do not simply obliterate the transverse depressions 67. Finally, the depression 72 may extend over only some of the depressions 67, and there may be more than one of those depressions 72.

The final embodiment 80 of protective or decorative strip shown in FIGS. 11 and 12 again has features in common with the other embodiments, and in FIGS. 11 and 12, the features in common with the other embodiments will be identified by reference numerals raised by 20 from the reference numerals of the previous embodiment, without further description. In this embodiment, the bottom 82 of the strip is provided with a plurality of the shallow transverse depressions 87 with the crests 88.

In contrast with the shallow depressions 67 and 37, the crests 88 of the depression 87 do provide a supporting function, like the crests 26 on the depressions 25. This is because there are only shallow depressions 87 in the embodiment of FIGS. 11 and 12 and no deep depressions.

There is in this embodiment a shallow longitudinal groove 95 defined in the top 81 of the strip which extends virtually the entire length of the strip but terminates short of the peripheral marginal region 84 of the strip 80. The depression 94 is deep enough to corrugate the top of the strip, and the bottom or crest 95 of the depression 94 is near enough to the crests 88 of the transverse depressions 87 that upon mechanical force being applied to the top 81 of the strip 80, the cooperation between the crests 88 and 95 will prevent undesired deformation of the strip. As in the prior embodiments, the number and spacing of the transverse depressions 87 may be adjusted as desired. The number, spacing and length of longitudinal grooves 94 in the top 81 of the strip may be adjusted as desired. The respective depths of the depressions 87 and 94 may be adjusted as desired, so long as the cooperation therebetween described above is realized.

Other embodiments with other variations may be apparent to persons skilled in this art. Such other and further embodiments should all share the common features of the invention comprising the transversely extending depressions in the bottom of the strip which permit the longitudinal expansion and contraction of the bottom of the strip with respect to the top of the strip and possibly also comprising the depression in the bottom of the strip having a sufficient depth that their crests provide a supporting function for the top of the strip, and possibly also the top of the strip being so shaped even having a depression therein forcooperating with the crests of the depressions in the bottom of the strip.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An elongate covering strip for an object, the strip being in the form of a closed, hollow, blow molded body of plastic material; the strip having a bottom shaped for being applied over an object to be covered; the strip having a top that is over and secured on the bottom of the strip; the strip being hollow within between the top and the bottom; the top having a contour for defining a contour for the hollow elongate strip;

the bottom of the strip including length compensation structures for compensating the length of the bottom with respect to the length of the top due to temperature variations between the top and the bottom of the strip and along the length of the strip; the length compensation structures comprising a plurality of transversely extending groove shaped depressions spaced at intervals along the length of the strip and each having a long dimension extending transversely of the strip and a shorter dimension extending lengthwise of the strip; each of the transversely extending depressions being tall enough in the bottom of the strip for corrugating the bottom of the strip for enabling the bottom of the strip to expand and contract with respect to the top of the strip upon the temperature variations.

2. The strip of claim 1, wherein at least one of the groove shaped depressions extends deeply enough into the bottom of the strip as to extend nearly to the top of the strip, and that groove shaped depression having a crest which is adapted for supporting the top of the strip upon the top of the strip being deformed toward the bottom of the strip.

3. The strip of claim 1 further comprising a longitudinally extending groove shaped depression in the bottom of the strip extending along the length of the strip, having a length dimension along the length of the strip which is considerably longer than its width dimension across the strip; the longitudinally extending depression intersecting at least some of the transversely extending depressions.

4. The strip of claim 3, wherein at least one of the groove shaped depressions extends deeply enough into the bottom of the strip as to extend nearly to the top of the strip, and that groove shaped depression having a crest which is adapted for supporting the top of the strip upon the top of the strip being deformed toward the bottom of the strip.

5. The strip of claim 4, wherein it is the longitudinally extending depression that extends deeply enough into the bottom of the strip to extend nearly to the top of the strip.

6. The strip of claim 2, wherein first ones of the depressions extend deeply enough into the bottom of the strip as to extend nearly to the top of the strip and others of the depressions extend less deeply into the bottom of the strip.

7. The strip of claim 6, wherein the first depressions are interspersed along the longitudinal length of the strip with the others of the depressions.

8. The strip of claim 1 further comprising a second plurality of round depressions in the bottom of the strip and the round depressions extending into the strip toward the top of the strip; the round depressions extending further toward the top of the strip than the transversely extending depressions; the round depressions extending deeply enough into the bottom of the strip as to extend nearly to of the top of the strip for providing support for the top of the strip for blocking deformation of the top of the strip toward the bottom of the strip.

9. The strip of claim 1, further comprising a longitudinally extending groove shaped depression defined in the top of the strip and projecting downwardly toward the bottom of the strip and being deep enough to corrugate the top of the strip; the longitudinally extending groove shaped depression in the top of the strip being longer in its length dimension along the strip and narrower in its width dimension across the strip.

10. The strip of claim 9, wherein the longitudinally extending depression has a crest; the transversely extending depressions in the bottom of the strip extend deeply enough into the strip and have crests which extend nearly to the crest of the longitudinally extending depression in the top of the strip for the crests of the depressions in the bottom of the strip to support the top of the strip against deformation toward the bottom of the strip.

* * * * *